W. DULIN.
INSTRUMENTS FOR AIDING ANIMALS IN GIVING BIRTH.
No. 179,538. Patented July 4, 1876.
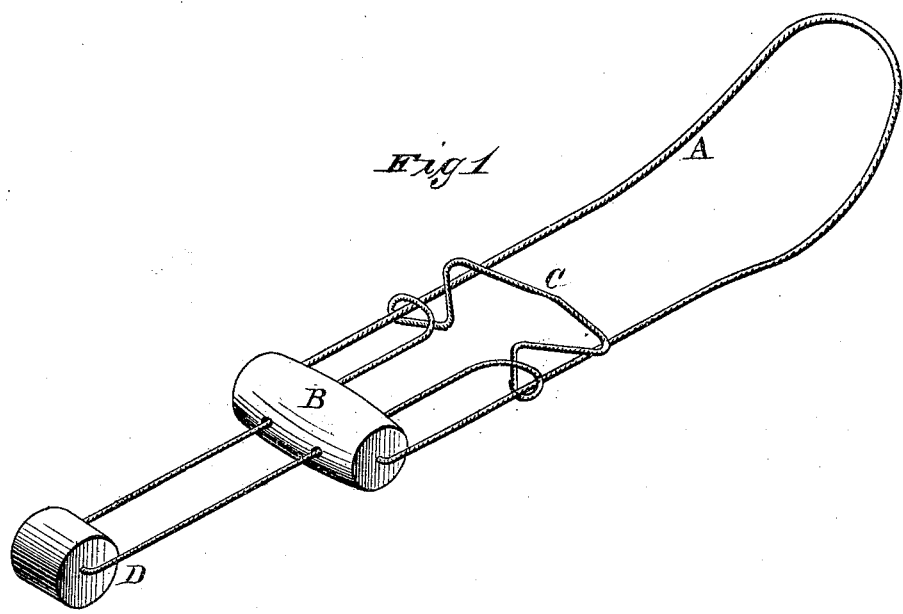

UNITED STATES PATENT OFFICE.

WILLIAM DULIN, OF BIG GROVE, IOWA.

IMPROVEMENT IN INSTRUMENTS FOR AIDING ANIMALS IN GIVING BIRTH.

Specification forming part of Letters Patent No. 179,538, dated July 4, 1876; application filed December 14, 1875.

*To all whom it may concern:*

Be it known that I, WILLIAM DULIN, of Big Grove, in the county of Pottawattamie, and in the State of Iowa, have invented certain new and useful Improvements in Instruments for Aiding Animals in Giving Birth; and do hereby declare that the following is a full, clear, and exact description thereof, reference being had to the accompanying drawing, and to the letters of reference marked thereon, making a part of this specification.

My invention consists in certain improvements in the instrument for aiding animals in giving birth, for which Letters Patent were granted to me December 7, 1875, as will be hereinafter more fully set forth.

In order to enable others skilled in the art to which my invention appertains to make and use the same, I will now proceed to describe its construction and operation, referring to the annexed drawing, in which the figure is a perspective view of my improved instrument.

This instrument or extricator is formed of two pieces of brass wire and two handles. The large wire A is bent in the center, and the ends brought around and inserted in the ends of the handle B, which makes the point of the loop that enters the animal in the shape of a large spoon. The small wire C is bent around both sides of the spoon-shaped wire A, so as to slide freely thereon, and its two ends are passed through holes in the large handle B, and fastened in the ends of the small handle D. The slide C is to be moved up to fasten the young animals in the loop while they are removed from the mother.

The size of the loop can easily be enlarged or diminished to suit the size of the young animal to be removed. I make no claim to this brace as constructed under this patent.

The ends of the wire loop C, passing through the handle B, cause said loop to be guided properly in its movements up and down on the spoon-shaped wire A.

Having thus fully described my invention, what I claim as new, and desire to secure by Letters Patent, is—

The combination, with the spoon-shaped wire A and handle B, of the loop C, bent around the sides of the wire A, and its ends passed through perforations in the handle B, and fastened to the handle D, substantially as and for the purposes herein set forth.

In testimony that I claim the foregoing I have hereunto set my hand this 26th day of November, 1875.

WM. DULIN.

Witnesses:
A. M. LENTZ,
C. S. DULIN.